United States Patent
Gillard et al.

(10) Patent No.: US 12,064,942 B2
(45) Date of Patent: Aug. 20, 2024

(54) METHOD FOR BUSBAR HIDING OF A LAMINATED GLAZING

(71) Applicant: AGC GLASS EUROPE, Louvain-la-Neuve (BE)

(72) Inventors: Quentin Gillard, Huy (BE); Descamps Fabien, Gosselies (BE); Charley Razzini, Gosselies (BE); Pierre Defoy, Gosselies (BE); Arthur Martinasso, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 22 days.

(21) Appl. No.: 17/904,430

(22) PCT Filed: Feb. 17, 2021

(86) PCT No.: PCT/EP2021/053922
§ 371 (c)(1),
(2) Date: Aug. 17, 2022

(87) PCT Pub. No.: WO2021/165342
PCT Pub. Date: Aug. 26, 2021

(65) Prior Publication Data
US 2023/0065516 A1    Mar. 2, 2023

(30) Foreign Application Priority Data
Feb. 19, 2020    (EP) .................................... 20158295

(51) Int. Cl.
*B32B 7/12*      (2006.01)
*B32B 17/10*    (2006.01)
(Continued)

(52) U.S. Cl.
CPC .. *B32B 17/10935* (2013.01); *B32B 17/10036* (2013.01); *B32B 17/10981* (2013.01);
(Continued)

(58) Field of Classification Search
CPC .................... B32B 17/10036; B32B 17/10761
See application file for complete search history.

(56) References Cited

U.S. PATENT DOCUMENTS

| 4,786,784 A | 11/1988 | Nikodem et al. |
| 5,782,945 A | 7/1998 | Gavin et al. |
(Continued)

FOREIGN PATENT DOCUMENTS

| EP | 0 761 617 A1 | 3/1997 |
| WO | WO 88/06095 A1 | 8/1988 |
(Continued)

OTHER PUBLICATIONS

International Search Report mailed on May 7, 2021 in PCT/EP2021/053922 filed on Feb. 17, 2021 (4 pages).

*Primary Examiner* — Elizabeth E Mulvaney
(74) *Attorney, Agent, or Firm* — Oblon, McClelland, Maier & Neustadt, L.L.P.

(57) ABSTRACT

A method for busbar hiding of a heated coating laminated glazing formed by a first glass sheet and a second glass sheet, each having an outer and an inner face. The method also includes performing enamel printing on an inner face of the first glass sheet and/or the second glass sheet, where the enamel forms a pattern. The enamel is fired and the pattern is covered at least in part by a coating, where the coating extends to at least an area of the enamel for applying busbars. At least two silver busbars are applied in the area on top of the extended coating. A thermal treatment is applied on the first and second glass sheets, where the first and second glass sheets are laminated and the coating is provided between the first and second glass sheets.

12 Claims, 2 Drawing Sheets

(51) Int. Cl.
*B32B 37/06* (2006.01)
*B32B 27/30* (2006.01)
*B32B 27/40* (2006.01)

(52) U.S. Cl.
CPC ............... *B32B 37/06* (2013.01); *B32B 7/12* (2013.01); *B32B 27/306* (2013.01); *B32B 27/40* (2013.01); *B32B 2250/40* (2013.01); *B32B 2255/20* (2013.01); *B32B 2255/205* (2013.01); *B32B 2255/28* (2013.01); *B32B 2264/1051* (2020.08); *B32B 2270/00* (2013.01); *B32B 2307/202* (2013.01); *B32B 2307/412* (2013.01); *B32B 2315/08* (2013.01); *B32B 2329/06* (2013.01); *B32B 2331/04* (2013.01); *B32B 2375/00* (2013.01); *B32B 2605/00* (2013.01)

(56) References Cited

U.S. PATENT DOCUMENTS

| | | |
|---|---|---|
| 5,796,071 A | 8/1998 | Morin et al. |
| 2006/0211561 A1 | 9/2006 | Houmes et al. |
| 2016/0185657 A1 | 6/2016 | Sakoske et al. |
| 2020/0359467 A1 | 11/2020 | Farreyrol et al. |
| 2022/0081356 A1* | 3/2022 | Farreyrol ............ B32B 17/1022 |

FOREIGN PATENT DOCUMENTS

| | | |
|---|---|---|
| WO | WO 2015/009377 A1 | 1/2015 |
| WO | WO 2019/143597 A1 | 7/2019 |

\* cited by examiner

METHOD FOR BUSBAR HIDING OF A LAMINATED GLAZING

FIELD OF THE INVENTION

The present invention is generally related to the field of laminated glazing provided with an electrically conductive system comprising thin layers.

BACKGROUND OF THE INVENTION

Laminated glazings comprising two (or more) sheets of glass and laminated together by a thermoplastic interlayer, are as such known. Such interlayer is used for safety reasons. However, it may be used to provide beneficial properties to the glazing such as solar control properties, electrical conductivity, heat insulation. The laminated glass is for example a vehicle windshield.

Windshields comprising an electrically conductive system were initially developed to impart properties of filtering infrared radiation. The windshield then comprises one or more metal layers essentially based on silver combined with dielectric layers which, on the one hand, protect the metal layers. Electrically conductive systems of layers have also been proposed in order to heat the windshield for the purpose of demisting or defrosting it. By means of the heat generated thanks to Joule effect by the heating layer, condensed moisture, ice, and snow can be removed within a short time. An advantage of using such windshields in motor vehicles, is that the central visual field has no substantial vision restrictions.

The heating current is usually introduced into the heating layer via at least one pair of strip-shaped electrodes (so called busbars), which, as collecting conductors, distribute the heating current over a wide front. Generally, in order to obtain adequate heating power for a practical application, the heating voltage must be sufficiently high, whereas in internal combustion engine driven motor vehicles, the currently standard available on-board voltage is from 12 to 48 volts.

The need to have, on the surface of the windshield, an area of high enough power per unit of surface area has led to various solutions.

There are some solution with wires in part that go back to a structure in which there is no conductive layer, the wires themselves forming a heating network which extends from one busbar to the other over the entire height of the windshield. The drawback of this solution is of course that wires are made visible and, although they contribute only partially to the heating, remain visible. They therefore are detrimental to the uniform appearance, which leads to the heating layers being preferred.

A large part of motor vehicle glazings comprise enameled patterns intended to conceal unsightly elements, in particular glue seals, electrical connections, and busbars and the like. Conventionally, these patterns are obtained by application of a composition comprising a glass frit, pigments and a vector in which the frit and the pigments are suspended. The application of these enamel compositions is followed by a high-temperature firing which melts the frit and attaches the enamel to the support.

Unfortunately, when the enamel is fired, and in the place where the busbars are provided and more particularly silver busbars, the busbars may remain partly visible leading to a non-acceptable (non-aesthetic) glazing for the car manufacturer. Thus, the choice of the type of enamel and its condition of firing are also driven by the compatibility with the heatable coating provided at least on the part of the surface of the glazing.

Hence, there is a need for an approach for accurately hiding the busbars in laminated glazing like e.g. in a windshield, whereby the above-mentioned constraints and requirements are taken into account.

SUMMARY OF THE INVENTION

It is an object of embodiments of the present invention to provide for a method for hiding busbars of a heated coating laminated glazing. It is a further object of embodiments of the present invention to provide for a laminated glazing with hidden busbars obtained by applying the proposed method.

The above objective is accomplished by the solution according to the present invention.

In a first aspect the invention relates to a method for busbar hiding of a heated coating laminated glazing formed by a first glass sheet and a second glass sheet, each having an outer and an inner face. The method comprises:

performing enamel printing on an inner face of the first glass sheet and/or the second glass sheet, whereby the enamel forms a pattern, firing said enamel, covering at least a part of the pattern formed by the enamel with a coating, said coating extending to at least an area of the enamel pattern for applying busbars, applying in that area at least two silver paste busbars on top of the coating, whereby at least one of the at least two silver paste busbars has a first and a second part, said first part arranged to apply a voltage and electrical current through a part of the coating provided under the first part of the at least one of the at least two silver paste busbars, thereby obtaining a stack formed by said at least two silver paste busbars, said coating and said enamel pattern, and the second part of the at least one of the at least two silver paste busbars is configured to not generate an electrical current through a part of the coating, the coating acting as a barrier between the migration of the silver of the silver paste busbar toward the enamel, firing said stack, applying a thermal treatment on the first glass sheet and the second glass sheet, laminating the first glass sheet and the second glass sheet with an interlayer sheet in contact with the inner faces of the first and the second glass sheet, whereby the coating is provided between the first glass sheet and the second glass sheet.

The proposed solution indeed allows for obtaining a coated laminated glazing with silver paste busbars which are invisible when looking at the glazing from an exterior side. The coating is applied so that at least a part of the pattern formed by the enamel is covered and that there is an area covered with coating available for applying busbars. On top of the coating one applies at least two silver paste busbars, to which a terminal can be connected for applying a voltage. Hence, there is no part of the busbars free of coating. At least one of the silver paste busbars comprises two (a first and a second) parts, whereby the first part is used for applying said voltage through the coating or at least a part thereof. The second part of said at least one silver paste busbar is in some embodiments employed only for transporting the voltage to the busbar part from where the voltage is applied. The second part of the at least one of the silver paste busbars bars is configured to not generate an electrical current through a part of the coating, the coating acting as a barrier between the migration of the silver of the silver paste busbar toward the enamel. Next a firing of the stack comprising the silver paste busbars, the coating and the enamel pattern is performed, which is as such a well-known process step. The first and second sheets of glass then undergo a thermal treatment. Finally the treated first and second glass sheets are laminated by establishing contact between an interlayer sheet and the inner faces of first and second sheet of glass, i.e. with the glass sheet side or sides that has/have been processed as described above.

It is an advantage of the invention that by applying the busbars on the coating, it is ensured that between the enamel and the silver paste there is always coating to form a barrier.

It is an advantage of the invention that the migration of silver into the enamel is avoided. In this way the busbars become invisible from the exterior. Moreover, the occurrence of cracks in the enamel layer is so avoided.

In embodiments of the method for busbar hiding according to the invention the second part is insulated from the coating by at least one insulation line. Providing the at least one insulation line is preceded by masking or laser decoating or mechanical abrasion of a part of the coating.

In some embodiments two of the busbars are substantially parallel and each provided with a terminal for power supply.

In certain embodiments one of the busbars is positioned substantially along the periphery of the part of the enamel pattern where coating is applied.

Advantageously the coating is a multilayer conductive coating including at least one layer of conductive material such as silver or gold. In a preferred embodiment the coating is infrared reflective.

In an advantageous embodiment the step of applying a thermal treatment consists of bending sheet-by-sheet the first and the second glass sheet, i.e. each sheet separately. When applying such a sheet-by-sheet approach the firing of the stack and the thermal treatment of the first and the second glass sheet can advantageously be done in a single operation. In another embodiment the thermal treatment is performed on the first and the second glass sheet simultaneously, i.e. on the ensemble of the two glass sheets.

In preferred embodiments the thermal treatment comprises a bending of said first and said second glass sheet.

In another aspect the invention relates to a laminated glazing comprising a first glass sheet and a second glass sheet, each having an outer and an inner face, and an interlayer sheet in contact with the inner faces of the first and the second glass sheet. On the inner face of at least one of the first and second glass sheet an enamel pattern is printed and at least a part of the pattern is covered with a coating. On top of the coating at least two silver paste busbars are applied. At least one of the at least two silver paste busbars has a first and a second part and one of the parts being arranged to apply a voltage through at least a part of the coating. The stack comprising the at least two silver paste busbars, the coating and the enamel pattern has been fired and a thermal treatment has been applied to the first glass sheet and the second glass sheet.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
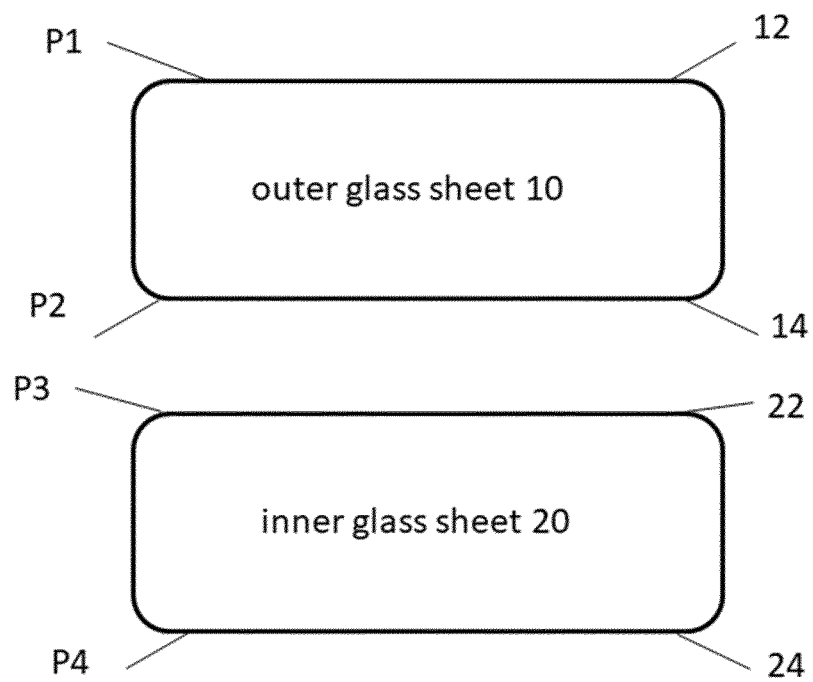
FIG. 1 illustrates a naming convention for the various surfaces of an outer and inner glass sheet.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention proposes a method for obtaining hidden busbars in a laminated glazing formed by joining a first glass sheet and a second glass sheet, whereby it is ensured that silver paste busbars applied to the first and/or second glass sheet cannot be seen from outside the glazing. The first sheet may be an outer glass sheet and the second sheet an inner glass sheet or vice versa.

When joining two sheets of glass, an outer sheet and an inner sheet, via an interlayer sheet, the inner and outer surfaces of the two glass sheets are commonly referred to as follows (see FIG. 1). The P1 and P2 surface correspond to the outer and inner surface of the outer glass sheet, respectively. If the laminated glazing is a vehicle windshield, surface P1 thus corresponds to the side that will be the exterior side of the windshield when mounted in the vehicle and looking at the windshield from outside the vehicle, whereas surface P2 is the other side of the outer sheet. The P3 and P4 surface belong to the inner glass sheet. Surface P4 represents the outer surface of the inner glass sheet a person sees from inside the vehicle. Finally, surface P3 corresponds to the inner side of the inner glass sheet. This is the nomenclature commonly used in the field of laminated glazing.

The method of busbar hiding of this invention can be applied to any sheet of glass, i.e. on an outer sheet or on an inner sheet or on both the outer and inner sheet. At the end of the treatment of either the outer or the inner sheet of glass or of both as set out below, the sheet is joined with the other sheet to form the laminated glazing. The laminated glazing may for example in advantageous embodiments be an automotive windshield, whereby 'automotive' may refer to a car, a train, an aeroplane and the like.

In the proposed approach one starts with sheets of glass obtained by cutting and grinding a raw sheet of glass. One of the glass sheets will be the outer sheet of the laminated glazing and the other one the inner sheet when the laminated glazing is installed in a vehicle for example.

Figure 2:
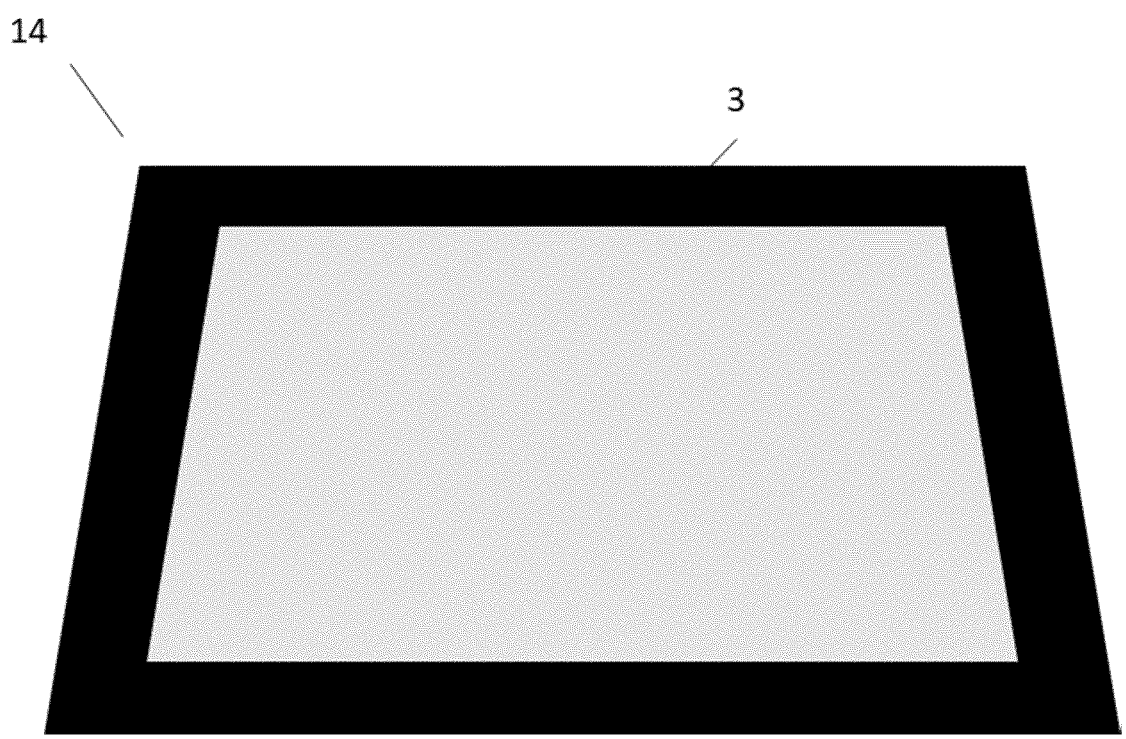
FIG. 2 illustrates a glass sheet on which an enamel pattern is printed.

On an inner face of the outer sheet and/or the inner sheet (hence, on a P2 or P3 surface in FIG. 1, an enamel printing is performed, whereby the enamel forms some pattern, e.g. a square or rectangular shaped pattern with a certain width. The enamel is typically applied up to the edges of the glass sheet(s). In some cases a small margin can be maintained between the glass edge and the enamel. FIG. 2 illustrates the inner face (14) of a glass sheet on which enamel is printed in a rectangular pattern (3).

An enamel firing is then usually performed, whereby the enamel is progressively heated from ambient temperature to a higher temperature in order to achieve a satisfactory melting of the glass frit inside the enamel.

In embodiments of the invention an electrically conductive coating is next deposited on at least a part of the pattern formed by the enamel printing. The heatable coating is applied using methods known per se. For example, the coating is done by magnetic field enhanced cathodic sputtering. This allows for a simple, quick, economical, and uniform coating.

The heatable coating is preferably transparent. In the context of this invention, a "transparent coating" means a coating that has, in the visible spectral range, transmittance of at least 50%, preferably at least 70%. This allows for the use of the glazing as automotive windshield.

The electrically conductive coating has at least one electrically conductive layer. The coating can additionally have dielectric layers, which serve, for example, for regulation of the sheet resistance, for corrosion protection, or for reducing reflection. The conductive layer preferably contains silver, e.g. at least 99% silver, or an electrically conductive oxide (transparent conductive oxide, TCO), such as indium tin oxide (ITO). The electrically conductive coating may comprise one silver layer, two silver layers, three silver layers, or even more. One preferred coating comprises two (Ag2) or three (Ag3) conductive layers containing silver. The conductive layer preferably has a thickness of 5 nm to 200 nm, particularly preferably from 10 nm to 50 nm. In that way a good compromise between transparency and electrical conductivity of the layer is achieved. To improve the conductivity with, at the same time, high transparency, the coating can have a plurality of electrically conductive layers, which are separated from one another by at least one dielectric layer. The conductive coating can include, for example, two, three, or four electrically conductive layers. Typical dielectric layers contain oxides or nitrides, for example, silicon nitride, silicon oxide, aluminium nitride, aluminium oxide, zinc oxide, or titanium oxide. Such coatings are particularly advantageous in terms of the transparency of the glazing, on the one hand, and its conductivity, on the other hand.

In preferred embodiments the coating is an infrared reflective coating (e.g. comprising 2 or three silver layers (Ag2 or Ag3). Having a laminated glazing provided with such a coating in a vehicle is advantageous to keep the temperature inside the vehicle under control.

The sheet resistance of the electrically conductive coating is preferably between 0.3 Ohm/square to 7 Ohm/square. Thus, advantageous heating powers are obtained with voltages customarily used in for example the automotive sector, with low sheet resistances resulting in higher heating power with application of the same voltage.

Figure 3:
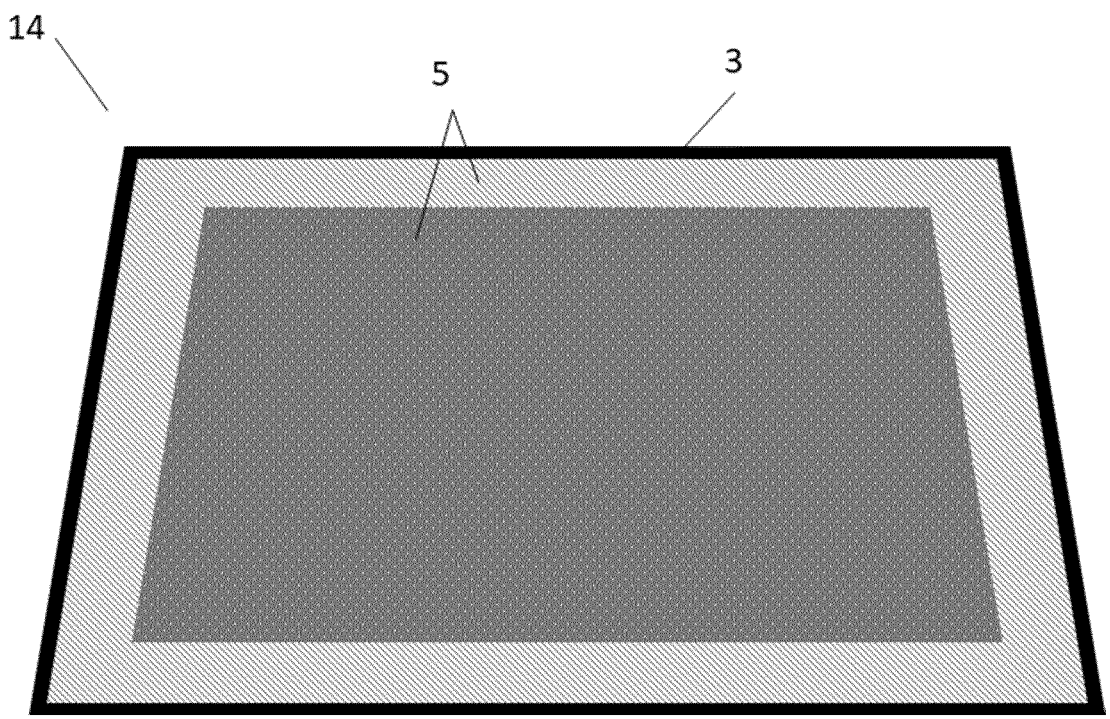
FIG. 3 illustrates an embodiment wherein the coating covers a part of the enamel pattern as well as the glass sheet.

FIG. 3 illustrates the coating (5) applied on a part of the enamel pattern (3) and on the glass. The coating extends to at least an area of the enamel wide enough to allow applying busbars. In preferred embodiments the coating is applied such that a frame-like edge region of the glazing with enamel printed on it remains uncovered with the heatable coating. This edge region is sometimes also referred to as an edge decoating or a cut-back. In this way it is ensured that the heatable coating has no contact with the surrounding atmosphere, thus preventing corrosion—the coating is, so to speak, encapsulated in the intermediate layer. The width of the coating-free edge region is typically in the range from 0.5 mm to 20 mm, in particular from 1 mm to 10 mm. The glazing can also include other uncoated regions, for example obtained by masking (before applying the coating) or laser decoating or mechanical abrasion such regions (after applying the coating). Such area(s) can for example be used as data transmission windows or communication windows. In other embodiments, e.g. like the one shown in FIG. 3, the portion of the glass sheet where no enamel was printed, may be completely covered with coating. In this case the coating is placed directly on top of the glass.

Then at least two silver paste busbars are added on top of the coating. Various techniques are available to the skilled person to perform this step, like for example screen printing, digital printing or the use of spraying. It is thereby made sure that the busbars are only applied on top of the coating and not on the enamel. The busbars each comprise a terminal for supplying power for heating the coating, or at least a part of the coating. At least one of the silver paste busbars comprises two (a first and a second) parts, whereby the first part is arranged to apply a voltage through the coating or at least a part thereof. The second part of said at least one of the silver paste busbar is in some embodiments employed only for transporting the voltage to the busbar part from where the voltage is applied. The second part of the at least one of the silver paste busbars is configured to not generate an electrical current through a part of the coating, the coating acting as a barrier between the migration of the silver of the silver paste busbar toward the enamel. step. A firing is then performed on the stack comprising the two or more busbars, the coating on which the busbars are applied and the part of the enamel pattern on which the coating is applied. The stack is thereby progressively heated from ambient temperature to a higher temperature in order to a satisfactory melting of the glass frit inside the silver paste to form a solid band of silver sticking/adhering on top of the substrate.

Figure 4:
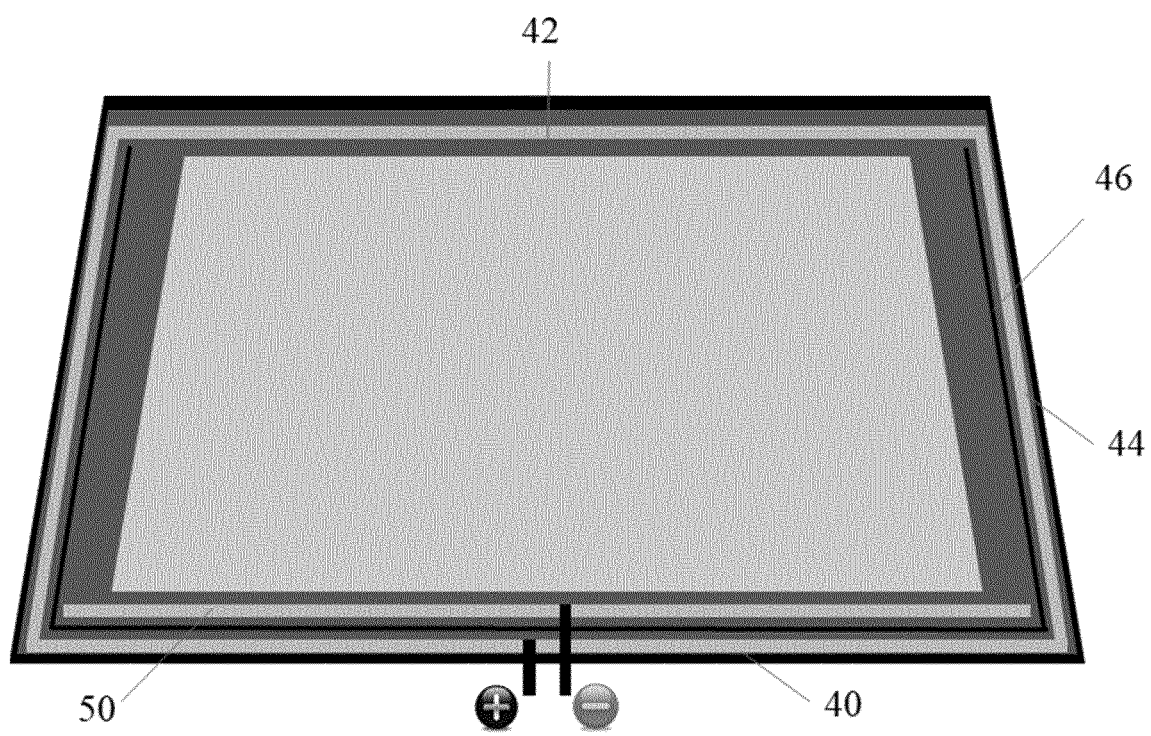
FIG. 4 illustrates an embodiment of a laminated glazing on which the method for busbar hiding according to the invention has been applied.

An illustration is provided in FIG. 4. In the shown embodiment there is on top of the coating one busbar (40) which basically follows the periphery of the part of the pattern formed by the enamel printing that was left uncovered by the heatable coating. A second busbar (50) then is placed parallel with one of the sides of the enamel pattern. Such an arrangement offers the advantage that the electrical terminals can be placed close to one another. The first busbar (40) comprises two parts (a first part and a second part). The first part (42) is for applying the voltage through the coating, or at least a part thereof. The second part (44) of the busbar serves in this embodiment to transport the voltage to said first part (42). This second part is positioned at the periphery of the coated region, hence close to the edge region of the enamel printed on the glazing. This busbar, and in particular the second part (44) of the busbar, advantageously makes use of the extended area where enamel is provided. The second part (44) is configured to not generate an electrical current through a part of the coating, the coating acting as a barrier between the migration of the silver of the silver paste busbar toward the enamel.

In order to transport the voltage and avoid current in coating (by shortcut effect), the coating is in preferred embodiments provided with at least one insulation line (46) positioned between the busbars (40, 50) and extended along the lateral edges of the glazing as shown if FIG. 3. In some embodiments there is a plurality of insulation lines. Such insulation lines can be obtained for example by locally masking the coating or by laser decoating of a part of the coating. In this disclosure an "insulation line" means a line-shaped region that is not electrically conductive within the electrically conductive coating. The width of the insulation lines depends on the technique adopted to obtain the insulation lines. Preferably the width is less than or equal to 500 µm, particularly preferably from 10 µm to 250 µm, most particularly preferably from 20 µm to 150 µm. However, in case masking is applied to obtain the insulation lines a minimum width of 500 µm is needed. The insulation line preferably extends over the entire thickness of the electrically conductive coating, but at least over the entire thickness of the electrically conductive layer(s) of the coating. The insulation lines thus create different zones which are electrically separated from one another. In this way a short circuit between two busbars is avoided.

In preferred embodiments there are two busbars. An examples has been provided in FIG. 4. In other embodiments, however, there may also be more than two busbars. In some embodiments, the busbars may be arranged on the laminated glazing in the left-right direction, for example covering practically the entire width of the screen. Alternatively, the busbars may be arranged in top-down direction, for example covering practically the entire height of the screen.

The length of the busbars depends on the design of the laminated glazing, in particular on the length of the edge along which the busbar is arranged, and can be appropriately selected in the individual case by the person skilled in the art. The "length" of the typically strip-shaped collecting busbars means their longer dimension, along which they are customarily contacted with the different heating strips sections.

In an embodiment the busbars are implemented as a printed and fired conductive structure. The printed busbars contain silver and optionally at least one other metal. The electrical conductivity is preferably realized through metal particles contained in the collecting conductor, in particular preferably through silver particles. The metal particles can be situated in an organic and/or inorganic matrix such as pastes or inks, preferably as a fired screen printing paste with glass frits. The layer thickness of the printed collecting busbars is preferably from 5 µm to 40 µm, particularly preferably from 8 µm to 20 µm, and most particularly preferably from 10 µm to 18 µm. Printed busbars with these thicknesses are technically easy to realize and have advantageous current-carrying capacity.

Once the silver paste printing on an inner layer of (one of) the glass sheets has been performed, the following further process steps may be carried out. A thermal treatment is applied to the first and the second glass sheet to pre-form them. This thermal treatment may in preferred embodiments be a bending, optionally followed by a tempering operation. In preferred embodiments the thermal treatment, e.g. the bending, is performed sheet-by-sheet, i.e., separately for the first glass sheet and for the second glass sheet. In this case the firing of the stack and the thermal treatment of the first and the second glass sheet can performed in a single operation. In other embodiments the first and the second glass sheet are first brought together and the ensemble of the two glass sheets is thermally treated.

The interlayer sheet is formed by at least one thermoplastic bonding film. The thermoplastic bonding film contains at least one thermoplastic polymer, preferably ethylene vinyl acetate (EVA), polyvinyl butyral (PVB), or polyurethane (PU) or mixtures or copolymers or derivatives thereof, particularly preferably PVB. The thickness of the thermoplastic bonding film is preferably in the range from 0.2 mm to 2 mm, particularly preferably from 0.3 mm to 1 mm, for example, 0.38 mm or 0.76 mm.

The proposed method leaves open the possibility of performing a step of enamel printing on an outer surface of one of the glass sheets. By adding such a second enamel layer e.g. on a P4 surface in certain embodiments of the method the adhesion problem encountered when gluing directly on the glass surface can be avoided.

In another aspect the invention relates to a laminated glazing, during the manufacturing of which a method for busbar hiding as set out above is applied. More in particular, such a laminated glazing comprises a first glass sheet (10) and a second glass sheet (20), each with an outer and an inner face, and an interlayer sheet in contact with the inner faces of the first and said second glass sheet. On the inner face of the first and second glass sheet or of both glass sheets enamel is printed to form a pattern. At least a part of the pattern is covered with a coating as described previously. On top of the coating at least two silver paste busbars (40,50) are applied. In other words, all of the busbar ground surface is in contact with coating. At least one of the two or more silver paste busbars has a first and a second parts, whereby a first part is arranged to apply a voltage through at least a part of the coating. The second part of the at least one of the two or more silver paste busbars is configured to not generate an electrical current through a part of the coating, the coating acting as a barrier between the migration of the silver of the silver paste busbar to the enamel. The stacks formed by the various busbars, the coating under the respective busbars and the part of the enamel pattern whereon the coating is applied then undergo a firing treatment. The two glass sheets are thermally treated. This can be done either sheet-by-sheet or the two together.

In order to establish the connection with the external voltage supply a supply line in electrical contact with at least one busbar is provided. Preferably each busbar has such a supply line. The supply lines can already end within the laminated glazing, i.e., before reaching an edge of the glazing, and be contacted with a flat conductor. Alternatively, the supply lines can extend beyond a glazing edge for contacting with the external connecting cables outside the laminated glazing.

The laminated glazing may in advantageous embodiment be a windshield that can be installed in a car, train, aeroplane or other transportation means.

Such a windshield is arranged to be defrosted or defogged when heating at least a part of the windshield by applying a voltage to the busbars provided on the windshield. As in the proposed approach the busbars are completely within the coated area of the windshield, the heating is mainly concentrated in the coated part of the windshield. It is to be noted that according to this invention the busbar(s) also comprise a second part which is not used for heating functionality. The coating is in that part of the busbar(s) basically used to form a barrier between the busbar(s) and the enamel.

Due to the silver paste busbars being on top of the coating the busbars are invisible when looking at the windshield from the exterior side of the vehicle wherein it is installed or when looking at the windshield from within the vehicle.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for busbar hiding of a heated coating laminated glazing formed by a first glass sheet and a second glass sheet, each having an outer and an inner face, the method comprising:
    performing enamel printing on an inner face of at least one of the first glass sheet and the second glass sheet, whereby an enamel forms a pattern;
    firing the enamel;
    covering at least a part of the enamel pattern with a coating, the coating extending to at least an area of the enamel pattern for applying busbars;
    applying in the area at least two silver paste busbars on top of the coating, whereby at least one of the at least two silver paste busbars has a first and a second part, the first part arranged to apply a voltage and an electrical current through at least a part of the coating provided under the first part of at least one of the at least two silver paste busbars, thereby obtaining a stack comprising the at least two silver paste busbars, the coating and the enamel, and the second part configured to not generate the electrical current through a part of the coating, the coating acting as a barrier between a migration of silver of the silver paste busbar toward the enamel pattern;
    firing the stack;
    applying a thermal treatment on the first glass sheet and the second glass sheet; and
    laminating the first glass sheet and the second glass sheet with an interlayer sheet in contact with the inner faces of the first and the second glass sheets, whereby the coating is provided between the first glass sheet and the second glass sheet.

2. The method for busbar hiding according to claim 1, wherein the second part is insulated by at least one insulation line from the coating.

3. The method for busbar hiding according to claim 2, wherein the at least one insulation line is preceded by masking, laser decoating, or mechanical abrasion of a part of the coating.

4. The method for busbar hiding according to claim 1, wherein two of the busbars are substantially parallel and each provided with a terminal for power supply.

5. The method for busbar hiding according to claim 1, wherein one of the busbars is positioned substantially along a periphery of the pattern.

6. The method for busbar hiding according to claim 1, wherein the coating is infrared reflective.

7. The method for busbar hiding according to claim 1, wherein the coating is a multilayer conductive coating including at least one layer of conductive material.

8. The method for busbar hiding according to claim 1, wherein the applying the thermal treatment on the first glass sheet and the second glass sheet is performed sheet-by-sheet.

9. The method for busbar hiding according to claim 1, wherein the thermal treatment is performed on the first and the second glass sheets simultaneously.

10. The method for busbar hiding according to claim 1, wherein the step of applying the thermal treatment comprises a bending.

11. A laminated glazing comprising:
   a first glass sheet and a second glass sheet, each having an outer and an inner face; and
   an interlayer sheet in contact with the inner faces of the first and the second glass sheets,
   wherein on the inner face of at least one of the first and the second glass sheets, enamel is printed to form a pattern and at least a part of the pattern is covered with a coating,
   wherein at least two silver paste busbars are applied on top of the coating, at least one of the at least two silver paste busbars having a first and a second part, the first part being arranged to apply a voltage through at least a part of the coating,
   wherein the at least two silver paste busbars have been fired and the first glass sheet and the second glass sheet are bent, and
   wherein the at least two silver paste busbars are hidden according to the method according to claim 1.

12. The laminated glazing according to claim 11, wherein the laminated glazing is a windshield.

* * * * *